US012528575B2

(12) United States Patent
Miller et al.

(10) Patent No.: US 12,528,575 B2
(45) Date of Patent: Jan. 20, 2026

(54) STRUCTURAL FRAMEWORK COMPONENTS

(71) Applicant: BAE SYSTEMS PLC, London (GB)

(72) Inventors: James Martin Miller, Christchurch (GB); Simon Bishop, Christchurch (GB); James Patrick O'Neill, Christchurch (GB)

(73) Assignee: BAE SYSTEMS PLC, London (GB)

( * ) Notice: Subject to any disclaimer, the term of this patent is extended or adjusted under 35 U.S.C. 154(b) by 181 days.

(21) Appl. No.: 18/285,692

(22) PCT Filed: Apr. 1, 2022

(86) PCT No.: PCT/GB2022/050838
§ 371 (c)(1),
(2) Date: Oct. 5, 2023

(87) PCT Pub. No.: WO2022/214794
PCT Pub. Date: Oct. 13, 2022

(65) Prior Publication Data
US 2024/0124117 A1 Apr. 18, 2024

(30) Foreign Application Priority Data

Apr. 6, 2021 (EP) ..................................... 21275038
Apr. 6, 2021 (GB) ..................................... 2104864

(51) Int. Cl.
*B64C 7/00* (2006.01)
*B64U 101/15* (2023.01)
*H01R 13/52* (2006.01)

(52) U.S. Cl.
CPC ............. *B64C 7/00* (2013.01); *H01R 13/521* (2013.01); *B64U 2101/15* (2023.01)

(58) Field of Classification Search
CPC ............ B64U 20/87; B64C 1/36; B64C 1/406
See application file for complete search history.

(56) References Cited

U.S. PATENT DOCUMENTS 2,554,634 A * 5/1951 Paine ....................... G01P 5/165
403/57
2,662,402 A * 12/1953 Ince, Jr. ................ B64D 43/02
73/180
2,936,617 A 5/1960 Beebe
(Continued)

FOREIGN PATENT DOCUMENTS

CN 209056600 U * 7/2019
CN 209454978 U * 10/2019
(Continued)

OTHER PUBLICATIONS

International Search Report and Written Opinion dated Jun. 10, 2022 issued in PCT/GB2022/050838.
(Continued)

*Primary Examiner* — Christopher P Ellis
(74) *Attorney, Agent, or Firm* — Scully, Scott, Murphy & Presser, P.C.

(57) ABSTRACT

In some examples, a structural framework component for an aerial platform comprises a body defining a cavity to receive a support system, and an arm to receive a payload, wherein the arm comprises a conduit to receive cabling linking a support system and a payload.

15 Claims, 4 Drawing Sheets

(56) References Cited

U.S. PATENT DOCUMENTS

| | | | |
|---|---|---|---|
| 5,927,648 A | | 7/1999 | Woodland |
| 2005/0285598 A1 | | 12/2005 | Barringer |
| 2006/0091258 A1 | | 5/2006 | Chiu et al. |
| 2013/0333462 A1 | * | 12/2013 | Argentieri ............. G01P 13/025 |
| | | | 73/170.05 |
| 2016/0039527 A1 | | 2/2016 | Goto et al. |
| 2017/0211296 A1 | * | 7/2017 | Do ........................... B64C 1/14 |
| 2019/0264864 A1 | | 8/2019 | Chen et al. |
| 2022/0355950 A1 | * | 11/2022 | Lukaczyk ............ G03B 15/006 |
| 2024/0132208 A1 | * | 4/2024 | Leal ..................... B64C 39/024 |

FOREIGN PATENT DOCUMENTS

| | | | | |
|---|---|---|---|---|
| CN | 211417623 U | * | 9/2020 | |
| DE | 202019105804 U1 | * | 12/2019 | .............. B64C 1/36 |
| EP | 0820158 A1 | | 1/1998 | |
| KR | 101983726 B1 | | 5/2019 | |
| WO | 2017130137 A1 | | 8/2017 | |
| WO | 2018033812 A1 | | 2/2018 | |
| WO | 2019097195 A1 | | 5/2019 | |

OTHER PUBLICATIONS

GB Search Report dated Oct. 7, 2021 issued in GB 2104864.0.
Extended EP Search Report dated Aug. 31, 2021 issued in EP 21275038.4.

* cited by examiner

STRUCTURAL FRAMEWORK COMPONENTS

TECHNICAL FIELD

Aspects relate, in general, to structural members for aerial platforms, and more specifically, although not exclusively, to structural framework components configured to enable a payload to be attached to an aerial vehicle or platform.

BACKGROUND

High-Altitude Long Endurance (HALE) unmanned aerial systems (UAS), also referred to as High Altitude Pseudo Satellites (HAPS), can comprise aerial vehicles/aircraft which operate at high altitudes for extended periods of time. Such aircraft can operate efficiently at altitudes ranging from around 6 to 14 miles (e.g., in the tropopause). Their high-altitude deployment and minimal need for active monitoring or control make them ideal candidates for a multitude of applications such as ultra-persistent intelligence, surveillance and reconnaissance, data collection and so on. In this connection, multiple sensor devices can be provided on a HALE aircraft to collect data of interest. For example, HALE systems can usefully accommodate a payload in the form of, e.g., communications relay payloads, optical photography sensor equipment, radar sensors and so on.

Typically, a payload for use with a HALE aircraft mounts to the exterior of the chassis so that components can be easily accessed. This is an inefficient use of the volume of the aircraft and means also that a change to a single component requires new mounting holes to be drilled in the chassis so that a new mounting solution can be implemented for that component. Furthermore, thermal management for components is passive. For example, every component is thermally coupled to the chassis and the chassis acts as a heatsink, regulating the temperature between all components. As the chassis can lose too much heat to the ambient environment, insulation is also required (such as around the inside of a fairing covering components for example), which is inefficient in terms of volume.

According to an example, there is provided a structural framework component for an aerial platform, the structural framework component comprising a body defining a cavity to receive a support system, and an arm to receive a payload, wherein the arm comprises a conduit to receive cabling linking a support system and a payload. The body can comprise a composite material, whereby to insulate a support system from the environment outside of the body. The body can comprise a lining of thermally insulating material on an inner surface thereof. A transition section disposed between or intermediate the body and the arm can be provided, the transition section having a reducing cross-section in a direction towards the arm. The arm can extend from the transition section in a symmetric manner and along (e.g., parallel to) the long axis of the body. The arm can be removably secured to the transition section. The arm can comprise one or more apertures configured to receive a fixing, whereby to enable mounting of a component of the aerial vehicle thereto. The arm can comprise one of a rhombus-, circular- and diamond-shaped cross-sectional profile. The body can comprise a square-shaped cross-sectional profile, although other suitable profile shapes are possible. A vertex of the arm is in line with the centre of a face of the body. The arm can receive a collar to enable a leaf structure to be mounted to the arm.

In an example, one end of the leaf structure can be fixedly or removably mounted to the transition section. The body can comprise a composite of a carbon fibre reinforced polymer outer shell and a high-density foam core. The transition section can receive a fairing, which may be in the form of a radome for example.

According to an example, there is provided an aerial platform, comprising a boom defining a mounting section to receive a structural framework component as claimed in any preceding claim. The structural framework component can be partially housed within the mounting section.

BRIEF DESCRIPTION OF THE DRAWINGS

For a more complete understanding of the present disclosure, reference is now made, by way of example only, to the following descriptions taken in conjunction with the accompanying drawings, in which.

DESCRIPTION

Figure 1:
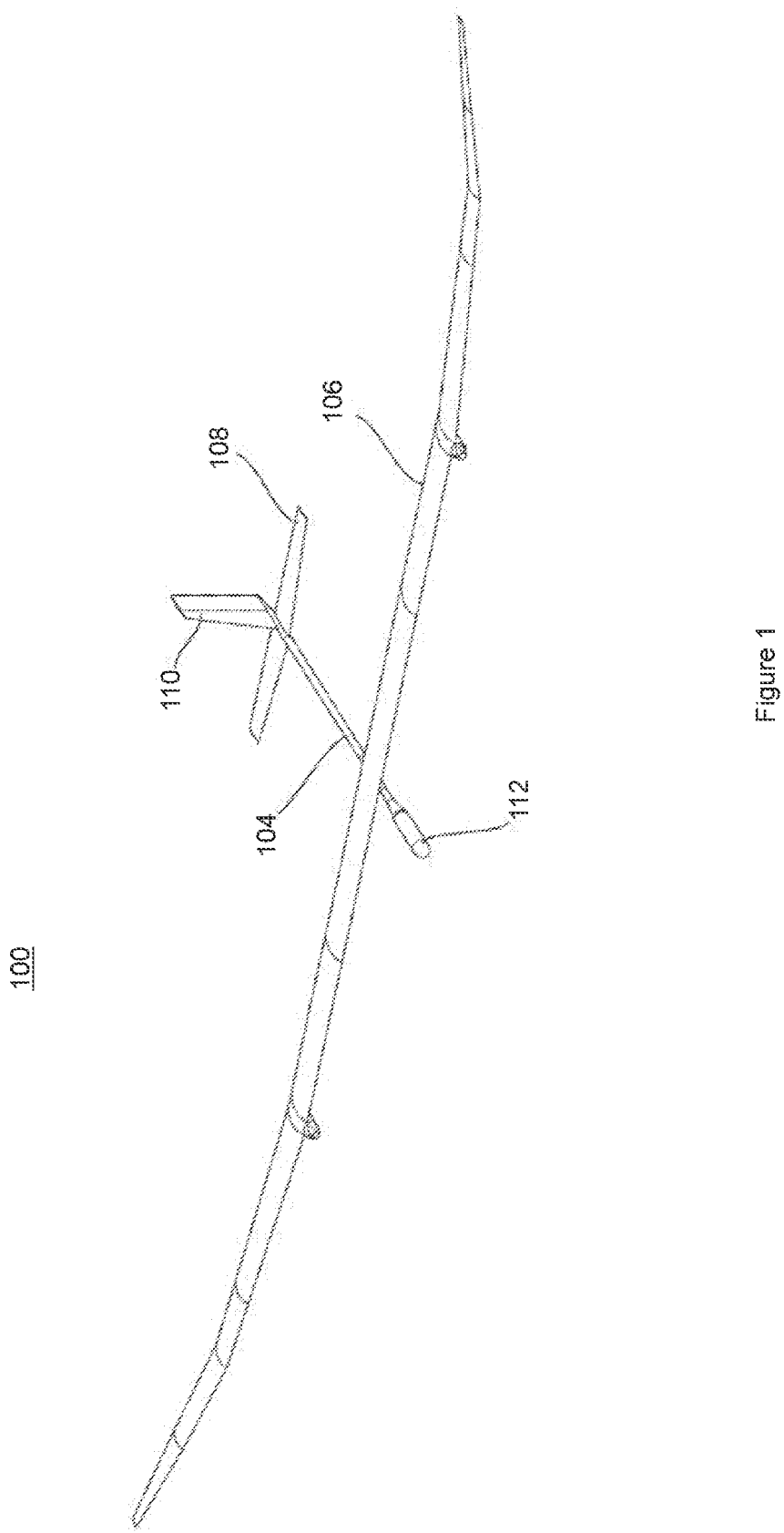
FIG. 1 is a schematic representation of a HALE aircraft according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

FIG. 1 is a schematic representation of an aerial platform or vehicle according to an example, in the form of a HALE aircraft. The aircraft 100, shown in perspective view, comprises a wing member 106, which has a relatively large wingspan, such as up to around 35 metres for example, and a relatively narrow chord, such as around 1 metre for example. The wing member 106 is coupled to a fuselage or boom 104. To aerodynamically balance the aircraft 100, a horizontal tail plane 108 and a vertical tail fin (or vertical stabilizer) 110 are coupled to the rear of the fuselage 104.

In an example, a payload can be coupled to the aircraft 100. The payload can comprise a sensor device for example, which is configured to generate data of interest, e.g., when the aircraft is airborne. Alternatively, or in addition, a payload can comprise an effector such as, for example, a Laser Directed Energy Weapon. The payload can be supported using a support system configured to provide power and data communications for the payload. For example, a power supply or power distribution system can be provided (for example, connection to a 5V rail, 12V rail, 28V rail and a 52V rail as these are the most common voltage specifications). Likewise, for command and control and data networks, a sensor/payload can be presented with, e.g., industry-standard interfaces (such as Ethernet, USB and/or serial RS485). A processing unit can be provided, which may be coupled with a storage system such as a solid-state storage system for example. The processing unit can be used to receive data from a payload, process it (e.g., according to some preselected routine configured for the payload in question) and store it in the storage system in a raw and/or processed form. Other components may be provided in a support system, such as heat sinks, and network modules (e.g., wireless or wired network modules). Components of a support system may be provided on a rail structure comprising, e.g., a pair of parallel structural rods configured to receive components that are mounted on brackets that can slide onto the rods and be fixed in a desired position, thereby supporting the components. Accordingly, a support system can be provided by the aircraft 100 in order to enable power and/or data transfer to/from a payload using, e.g., data and power cables that can be attached to the payload in question. That is, certain functions and requirements of a payload can be provided by an electronic support system of the aircraft.

A common mounting structure to enable multiple different payloads to be received by the aerial vehicle can be provided. A mounting structure according to an example may be located on the fuselage 104. For example, a mounting structure can be provided on or within the nose 112 of the aircraft 100, such as within a fairing at the nose of the aircraft. Alternatively, or in addition, a mounting structure can be provided on the wing member 106 (on one, other or both sides relative to the fuselage for example) and/or on the tail plane 108, vertical tail fin 110. As such, one or more mounting points can be provided for the aircraft that are configured to enable releasable mounting (or connection) of a payload to the aircraft.

In some examples, a sensor with an aerodynamic shape can be used, thereby obviating the need for the use of a fairing, which may therefore be dispensed with in such circumstances. It is also possible that a fairing, according to an example, can comprise a radome. That is, a payload may comprise a radar system for example, and a fairing (if present) can define a radome. The radome can be transparent to a selected RF wavelength.

According to an example, a structural framework component is provided, for an aerial platform. The structural framework component can comprise a body defining a cavity to receive a support system such as that outlined above, and an arm to receive a payload, wherein the arm comprises a conduit to receive cabling linking a support system and a payload. In the context of HALE aircraft for example, the size, weight and power of a payload is a limiting factor. The structural framework component according to an example, is efficient in terms of all three of these criteria, thereby enabling a payload to be supported on a platform whilst minimising weight and volume penalties otherwise associated with the provision of payloads. A structural framework component according to an example provides a multi-functional component, which can structurally couple a customer-specified payload/sensor to the platform, host components used to support the payload/sensor (for example, communications equipment and power distribution systems) within the chassis (i.e., in a volume optimised design), insulate the components inside the chassis as a thermal control solution (which removes the need for large, heavy and power hungry active thermal control solutions), and which is modular in design enabling it to be easily swapped out.

Figure 2:
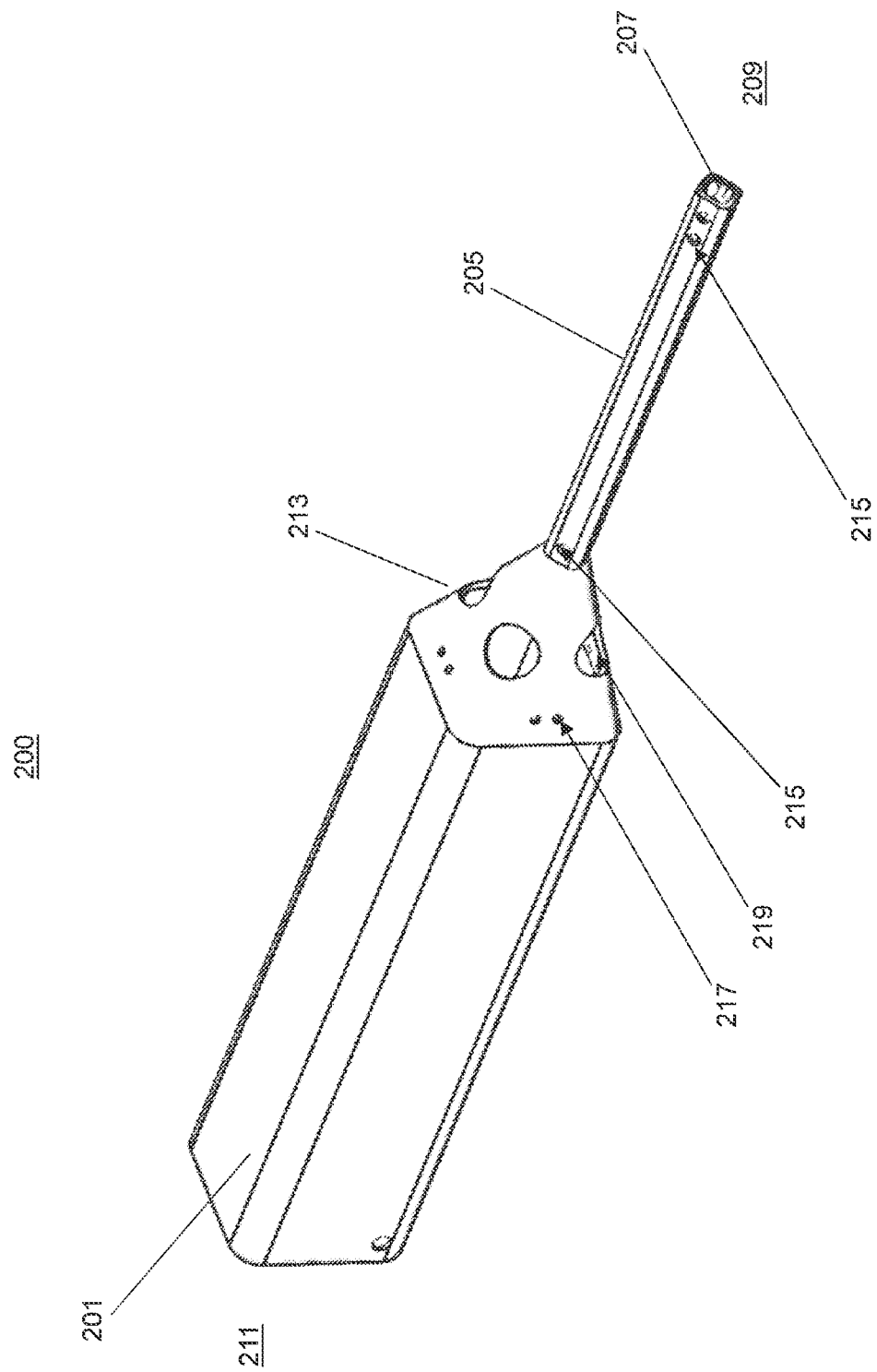
FIG. 2 is a schematic representation of a structural framework components according to an example.

FIG. 2 is a schematic representation of a structural framework component according to an example. The structural framework component 200 comprises a body 201 defining a cavity 203 (not visible in FIG. 2) to receive a support system such as that outlined above, and an arm 205 to receive a payload, wherein the arm 205 comprises a conduit 207 to receive cabling linking a support system and a payload.

In an example, the structural framework component 200 can be manufactured as a single piece to ensure structural rigidity between a relatively heavy (e.g., ~10 kg or more) payload at the front 209 and the main aircraft boom at the back (i.e. rear, the side facing the aircraft 100 when in use) 211. In the example of FIG. 2, the rear section of the structural framework component 200 forming the body 201 is configured to slot inside the boom of an aircraft, such as that described with reference to FIG. 1. A transition section 213 is provided between the body 201 and the arm 205. In an example, a payload can be mounted to the front of the structural framework component 200 using a sensor interface assembly (not shown) that can be attached to the arm.

In an example, the length of the arm 205 can be adjusted to accommodate more or less components to be mounted outside of the boom of an aircraft. For example, a communications radio, which may otherwise be too wide to fit within the cavity in the body 201, can be mounted externally to arm 205, with the width of the arm able to be increased in order to increase structural rigidity.

In an example, a vertex of the arm 205 is in line with the centre of a face of the body 201. That is, with reference to FIG. 2 for example, the body is provided with a square cross section, whilst the arm is so arranged (e.g., relative to the orientation of the body) as to define a diamond cross sectional profile such that a vertex of the diamond is arranged in line with the centre of a face of the body. It will further be appreciated, as can be seen for FIG. 2 for example, that the arm transitions from the body by way of the transition section located intermediate the two in a symmetric manner. That is, the arm is located centrally with respect to the centre of the body and continues to extend along the same axis. However, in some examples, a non-symmetrical transition can be provided. For example, the arm can be aligned with, e.g., the bottom of the aircraft boom rather than the centre and/or can extend outwards in an off-axis direction (with respect to the long axis of the body for example).

Figure 3:
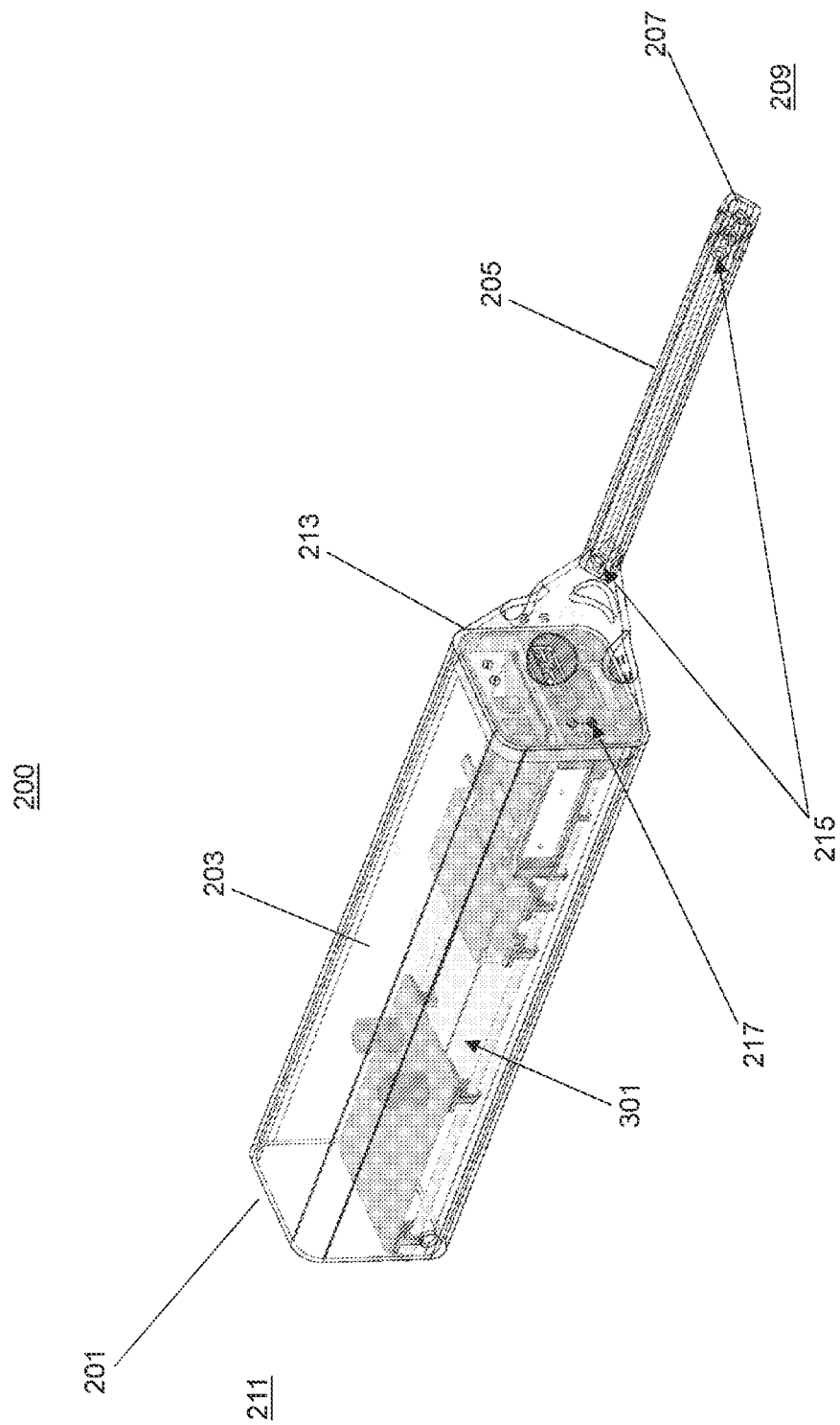
FIG. 3 is a schematic representation of a structural framework components according to an example.

FIG. 3 is a schematic representation of a structural framework component according to an example. In the example of FIG. 3, the cavity 203 is visible, and a support system 301 comprising multiple components to support a payload is depicted within the cavity. That is, the body 201 (or a portion thereof) can fit inside an aircraft boom and can house components for a support system. Arm 205 is, in the example of FIGS. 2 and 3, hollow, thereby defining a conduit. This tends to reduce mass and provides a cable conduit allowing a sensor (mounted in front of the structure 200) to be cabled through to, e.g., power rails or other components hosted either within the boom section of the structure 200 or elsewhere on the platform.

According to an example, the structure 200 can be manufactured using carbon fibre or a carbon fibre reinforced polymer (CFRP) and high-density foam (such as, e.g., Rohacell™) sandwich composite. The nature of a sandwich composite is to take advantage of the high tensile and compressive strength of the carbon fibre at distances far from the neutral axis, without adding excessive amounts of carbon fibre (with the associated cost and mass penalty). In addition to having desirable strength properties, the use of a foam (such as Rohacell™) within the sandwich composite provides a layer of insulation around the components of the support system within the body 201.

For stratospheric applications for example (where the ambient temperature is around −49° C. at the warmest, and below about −85° C. at the coldest), insulation between the ambient conditions and the components (which typically have operating limits between −20° C. and +55° C.) is desirable. Further thermal insulation can be provided for the components by covering the inside of the body 201 with a thermally insulating material and/or a silver lining (such as aluminium foil tape for example) to encourage radiation of heat away from the walls and minimise any heat transfer through the walls of the body 201.

According to an example, the transition section 213 can comprise a reducing cross-section in a direction towards the arm 205 (from the body 201, as shown in FIGS. 2 and 3 for example). The arm 205 may be removably secured to the transition section.

Arm 205 can comprise one or more apertures 215 configured to receive a fixing, whereby to enable mounting of a component of the aerial vehicle thereto. For example, the arm may receive a collar to enable a component to be fitted thereto. The collar can be secured to the arm using fixings that can pass through the apertures 215.

Figure 4:
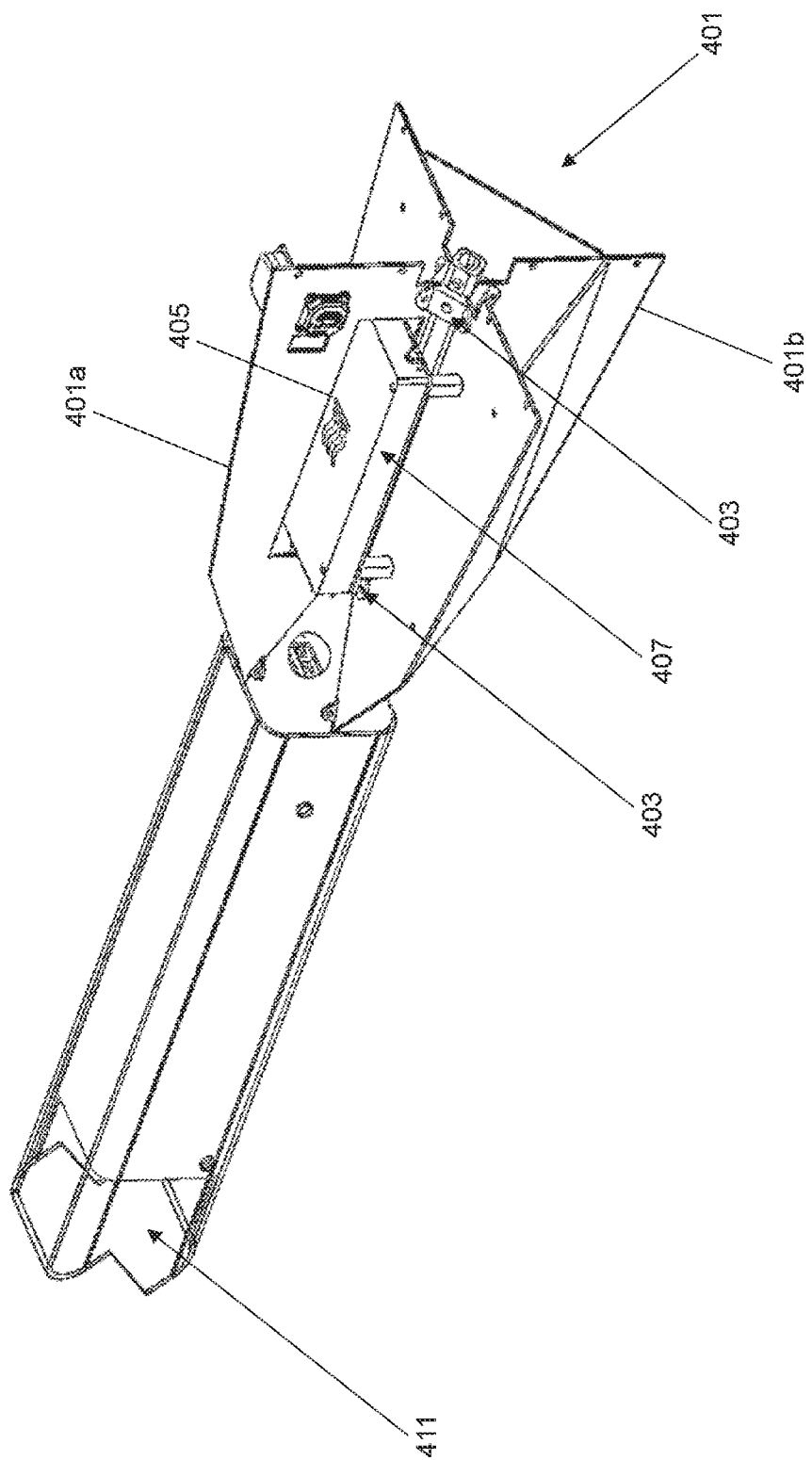
FIG. 4 is a schematic representation of a structural framework components according to an example.

With reference to FIG. 4, which is a schematic representation of a structural framework component according to an example, such a component to be fitted to the arm in this way can comprise a leaf structure in which one end of the leaf structure is additionally fixedly mounted to the transition section 213 by way of apertures 217. In an example, multiple leaves 401 may be removably mounted to the arm 205 and transition section 213. That is, four cruciform leaves can attach to the structure 200 via, e.g., two diamond shaped (in cross-section) sleeves or collars 403 that slide over the arm 205, thereby allowing components to be mounted to the leaves and allowing the leaves 401 to provide added structural rigidity. In an example, the outer contour of the leaves 401 can be selected to match the shape of a fairing to provide support for the fairing. In another example, a leaf 401a can slide into a channel on the top/bottom and right/left of the arm 204, removing the need for a collar.

In an example, a leaf 401a can comprise a cut out portion 405 to enable a component 407 to be slotted therethrough. For example, a component 405 can pass through one leaf 401a whilst being supported by two others that act as a platform for the component.

While the arm 205 is configured to support the majority of the structural load, the leaves 401 can provide support due to their position far away from the neutral axis (where the neutral axis runs through the centre of the arm 205). In an example, if the top and bottom leaves (401a, 401b) are aligned parallel to the gravitational force a payload sensor experiences, the leaves 401 will contribute significantly to reducing the bending stress experienced by the arm 205. The maximum bending stress of a beam will occur at the maximum distance from the neutral axis, which is the top and bottom of the arm in this case. By attaching the leaves 401 to both the transition piece of the structure and, e.g., a sensor interface plate, the leaves 401 tend to act to increase the distance from the neutral axis and therefore reduce the localisation of the bending stress.

In the example of FIG. 4, the body 201 can be seen nested within a section (e.g., a mounting section that is so profiled as to receive the body of the structure) of a boom 411 of an aerial platform. In an example, the structural framework component may be partially housed within the mounting section.

The invention claimed is:

1. A structural framework component for an aerial platform, the structural framework component comprising:
a body defining a cavity to receive a support system; and
an arm to receive a payload, wherein the arm comprises a conduit to receive cabling linking the support system and the payload.

2. The structural framework component as claimed in claim 1, wherein the body comprises a composite material, whereby to insulate the support system from an environment outside of the body.

3. The structural framework component as claimed in claim 1, wherein the body comprises a lining of thermally insulating material on an inner surface thereof.

4. The structural framework component as claimed in claim 1, further comprising a transition section disposed between the body and the arm, the transition section having a reducing cross-section in a direction towards the arm.

5. The structural framework component as claimed in claim 4, wherein the arm is removably secured to the transition section.

6. The structural framework component as claimed in claim 1, wherein the arm comprises one or more apertures configured to receive a fixing, whereby to enable mounting of a component of the aerial platform thereto.

7. The structural framework component as claimed in claim 1, wherein the arm has one of a rhombus-, circular- and diamond-shaped cross-sectional profile.

8. The structural framework component as claimed in claim 1, wherein the body has a square-shaped cross-sectional profile.

9. The structural framework component as claimed in claim 7, wherein a vertex of the arm is in line with a centre of a face of the body.

10. The structural framework component as claimed in claim 1, wherein the arm is configured to receive a collar to enable a leaf structure to be mounted to the arm.

11. The structural framework component as claimed in claim 10 further comprising a transition section disposed between the body and the arm, wherein one end of the leaf structure is fixedly mounted to the transition section.

12. The structural framework component as claimed in claim 1, wherein the body is a composite of a carbon fibre reinforced polymer outer shell and a high-density foam core.

13. The structural framework component as claimed in claim 4, wherein the transition section is configured to receive a fairing.

14. An aerial platform, comprising a boom defining a mounting section to receive a structural framework component as claimed in claim 1.

15. The aerial platform as claimed in claim 14, wherein the structural framework component is partially housed within the mounting section.

* * * * *